(12) United States Patent
Evans

(10) Patent No.: US 11,394,754 B2
(45) Date of Patent: Jul. 19, 2022

(54) SYSTEM AND METHOD OF ADMISSION CONTROL OF A COMMUNICATION SESSION

(71) Applicant: Comcast Cable Communications, LLC, Philadelphia, PA (US)

(72) Inventor: Eric Anthony Evans, Westminster, CO (US)

(73) Assignee: COMCAST CABLE COMMUNICATIONS, LLC, Philadelphia, PA (US)

( * ) Notice: Subject to any disclaimer, the term of this patent is extended or adjusted under 35 U.S.C. 154(b) by 752 days.

(21) Appl. No.: 15/091,287

(22) Filed: Apr. 5, 2016

(65) Prior Publication Data
US 2017/0289207 A1    Oct. 5, 2017

(51) Int. Cl.
| G06F 15/16 | (2006.01) |
| H04L 65/1076 | (2022.01) |
| H04L 65/1096 | (2022.01) |
| H04L 65/1069 | (2022.01) |

(52) U.S. Cl.
CPC ...... *H04L 65/1079* (2013.01); *H04L 65/1069* (2013.01); *H04L 65/1076* (2013.01); *H04L 65/1096* (2013.01)

(58) Field of Classification Search
CPC ............ H04L 65/1079; H04L 65/1069; H04L 65/1076; H04L 65/1096
See application file for complete search history.

(56) References Cited

U.S. PATENT DOCUMENTS

| 6,922,466 | B1 | 7/2005 | Peterson et al. |
| 7,636,432 | B2 | 12/2009 | Bushey et al. |
| 8,634,520 | B1 | 1/2014 | Morrison et al. |
| 9,396,730 | B2 * | 7/2016 | Karpey ................ G10L 17/26 |
| 9,729,586 | B2 * | 8/2017 | Brewer ............. H04L 65/1076 |
| 2014/0289303 | A1 * | 9/2014 | Tarricone .............. H04L 67/10 709/201 |

* cited by examiner

*Primary Examiner* — Ryan J Jakovac
(74) *Attorney, Agent, or Firm* — Ballard Spahr LLP

(57) ABSTRACT

Described herein are methods and systems for admission control of a communication session over a communication network. The methods and systems of the present disclosure may comprise determining whether a communication session originates from an originating device that is part of an autodialing system. If the communication session does originate from an autodialing system, the methods and systems can determine whether the autodialing system is a valid autodialing system or an invalid autodialing system. The methods and systems can process or block future communications sessions from the originating device depending on whether the autodialing system is a valid autodialing system or invalid autodialing system, respectively.

21 Claims, 8 Drawing Sheets

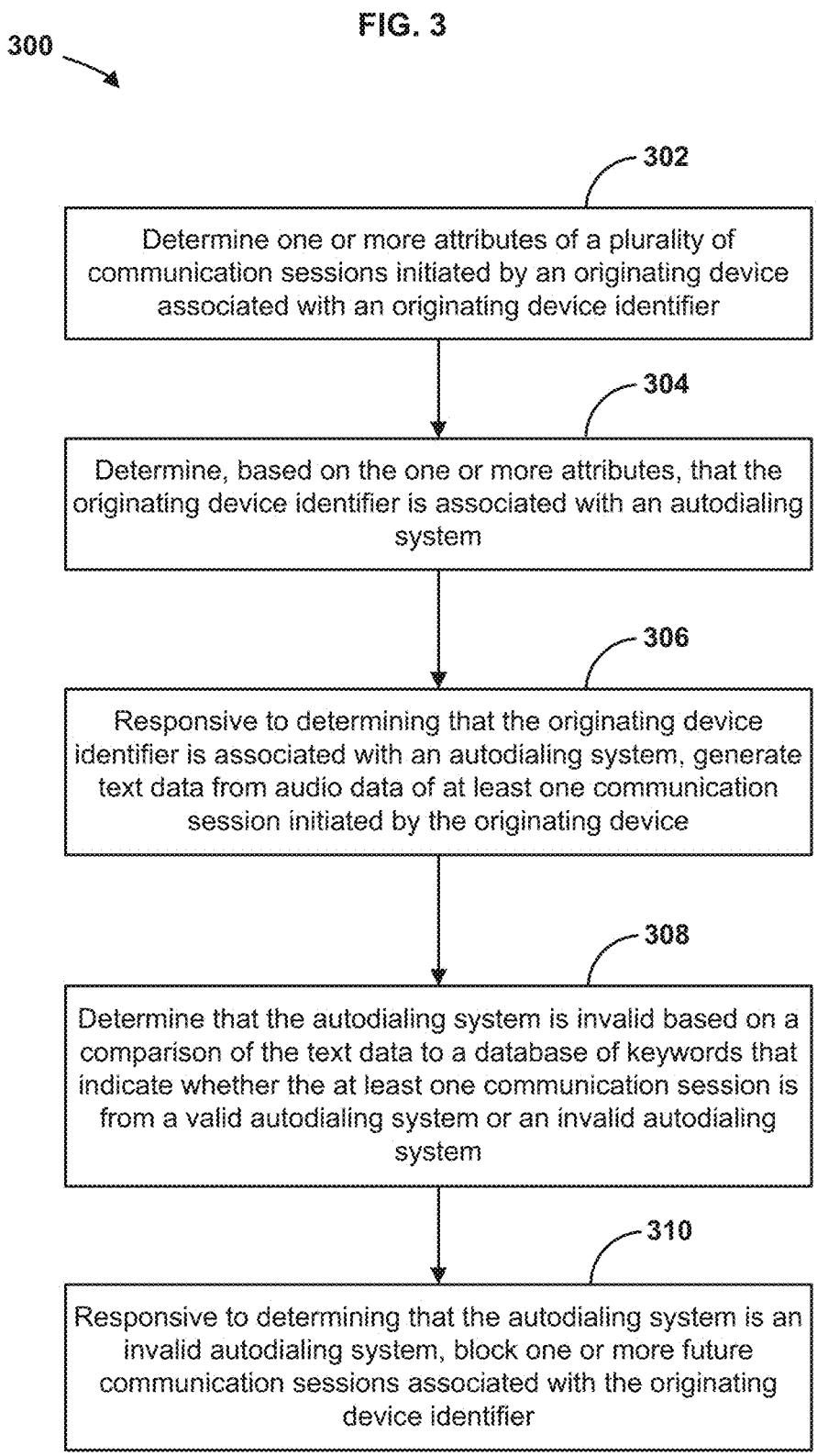

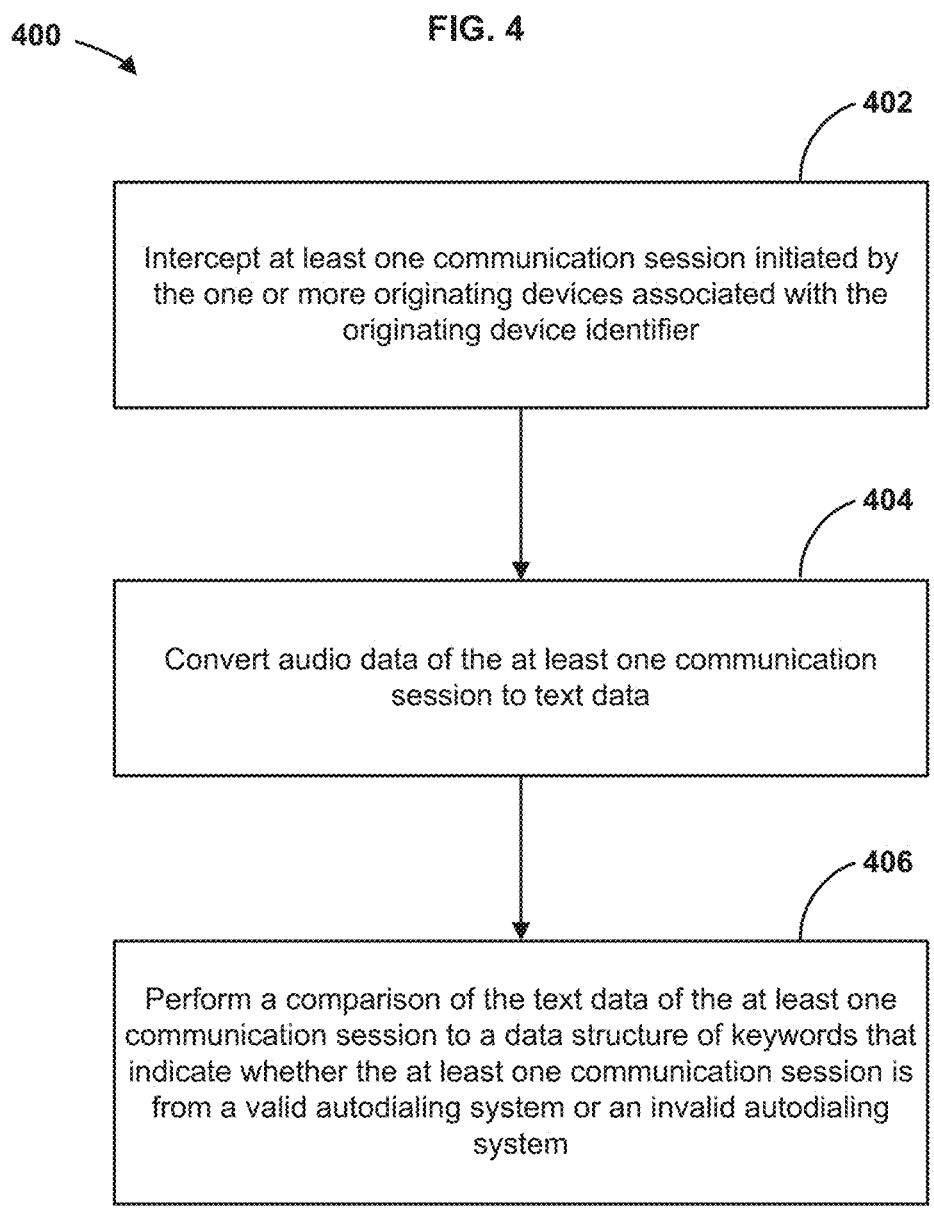

502 — Determine one or more attributes of a plurality of communication sessions initiated by one or more originating devices associated with an originating device identifier

504 — Determine whether the originating device identifier is associated with an autodialing system based on the one or more attributes

506 — Determine whether the autodialing system associated with the originating device identifier is a valid autodialing system if the originating device identifier is associated with an autodialing system

508 — Processing one or more future communication sessions associated with the originating device identifier if the originating device identifier is determined to be associated with a valid autodialing system

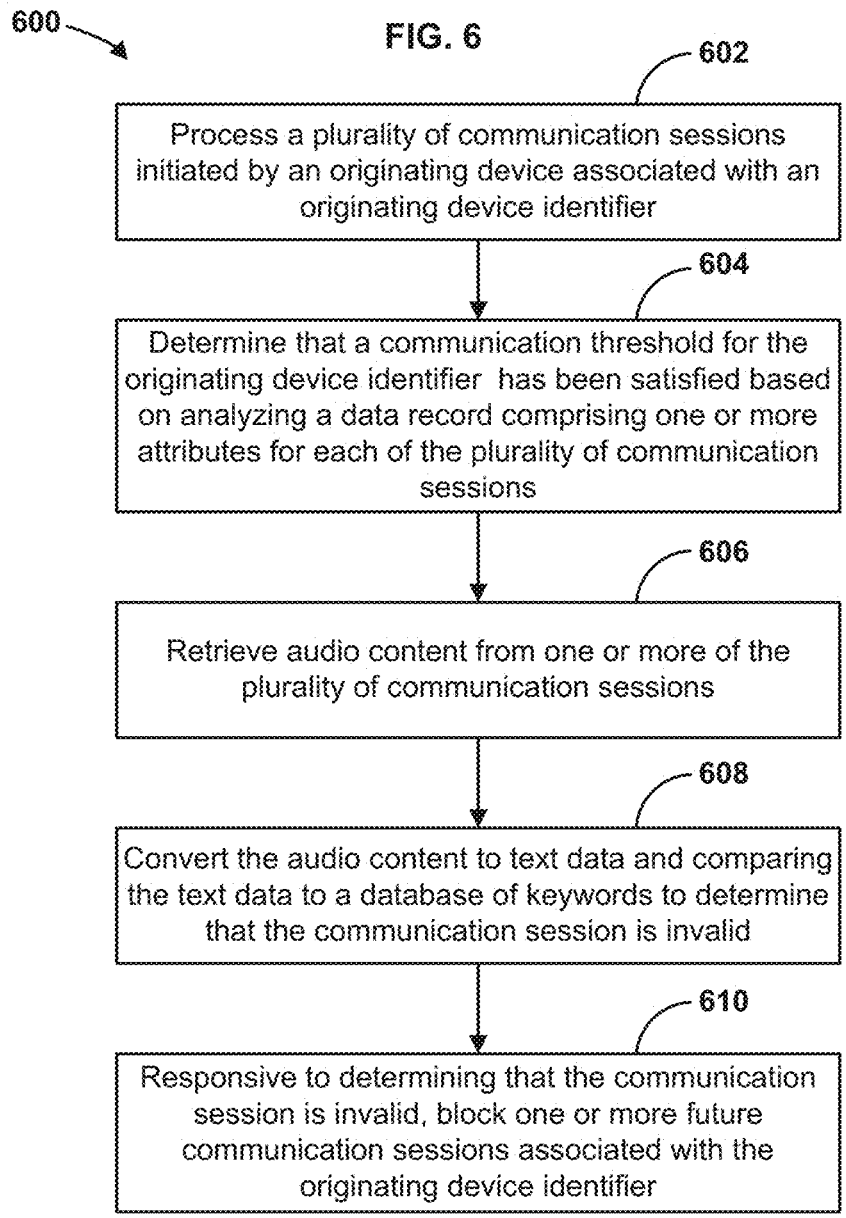

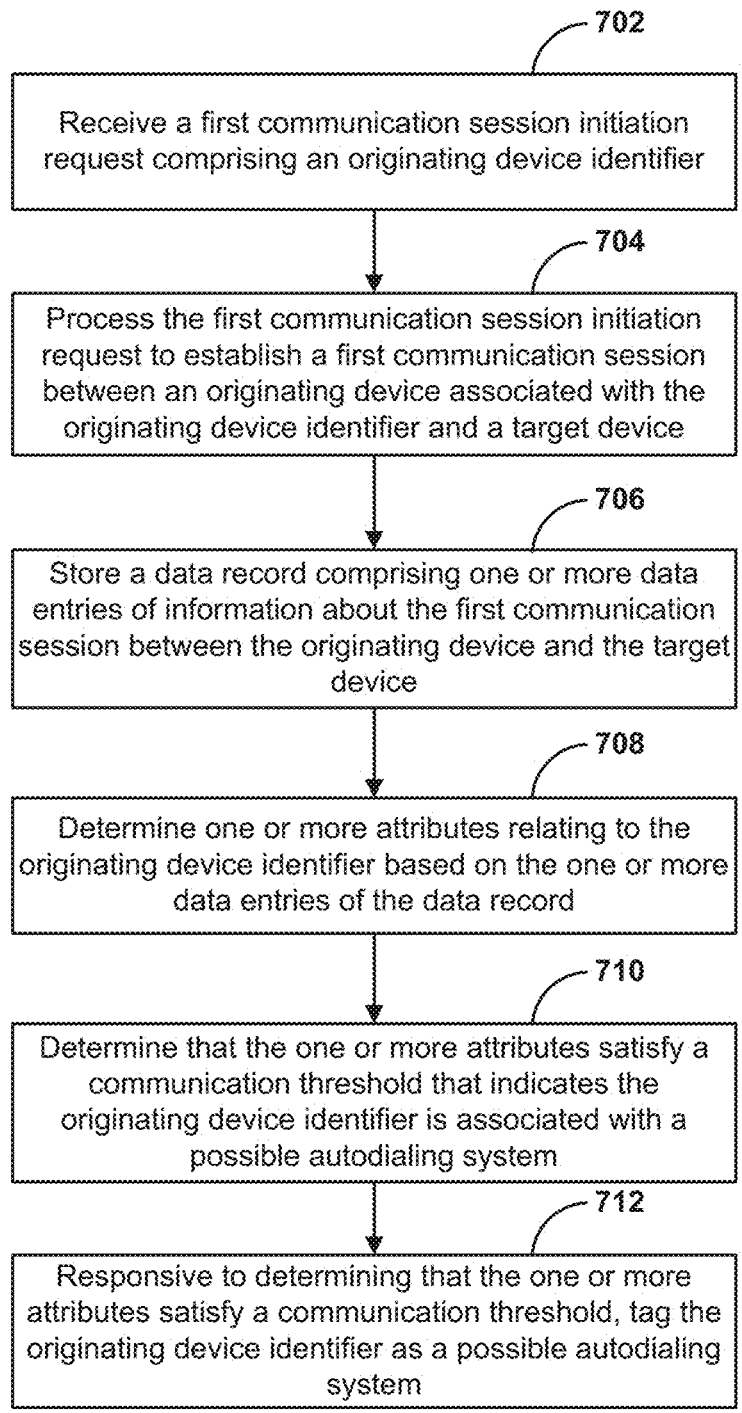

SYSTEM AND METHOD OF ADMISSION CONTROL OF A COMMUNICATION SESSION

BACKGROUND

Establishment of a communication session generally entails allocation of network resources (e.g., bandwidth, communication channels (such as signaling channels), Packet Data Protocols (PDPs), processing resources, and the like), regardless of whether the communication session is initiated successfully. Such allocation can tie up network resources that can create network congestion, particularly in scenarios in which the communication session is an automated voice session originating from an autodialing system. Therefore, there is a need to manage communication sessions that are automated voice sessions. These and other shortcomings are addressed in the present disclosure.

SUMMARY

It is to be understood that both the following general description and the following detailed description are exemplary and explanatory only and are not restrictive, as claimed. Described herein are methods and systems for blocking communications from an invalid autodialing system. A device initiating a communication session can be flagged as a possible autodialing system. For example, if a device initiates a threshold number of communication sessions within a predetermined amount of time, then the device initiating the communication sessions can be flagged as a possible autodialing system. As another example, if a device initiates a threshold number of communication sessions that are terminated before a predetermined amount of time, then the device can be flagged as a possible autodialing system.

Once a device is flagged as a possible autodialing system, further analysis of communications from the flagged device can be performed. For example, analysis can comprise comparing audio and/or text from two communication sessions. As another example, analysis can comprise comparing audio and/or text of communications with a keyword list. If the analysis results in a conclusion that the flagged device is an autodialing system, then more analysis can be performed to determine if the autodialing system is a valid autodialing system. Communications from the autodialing system can be analyzed to determine if the autodialing system is a valid or invalid autodialing system. For example, a political autodialing system might be a valid autodialing system. Audio and/or text from a communication session can be analyzed to against a list of words indicating a valid autodialing system. Audio and/or text from a communication session can be analyzed to against a list of words indicating an invalid autodialing system. Future communications from an autodialing system determined to be invalid can be blocked Additional advantages will be set forth in part in the description which follows or may be learned by practice. The advantages will be realized and attained by means of the elements and combinations particularly pointed out in the appended claims. It is to be understood that both the foregoing general description and the following detailed description are exemplary and explanatory only and are not restrictive, as claimed.

BRIEF DESCRIPTION OF THE DRAWINGS

The accompanying drawings, which are incorporated in and constitute a part of this specification, illustrate embodiments and together with the description, serve to explain the principles of the methods and systems:

FIG. 3 is a flow chart of another example method;

FIG. 4 is a flow chart of a sub-method to a step in FIG. 3 and FIG. 5;

FIG. 5 is a flow chart of another example method;

FIG. 6 is a flow chart of another example method;

FIG. 7 is a flow chart of another example method; and

DETAILED DESCRIPTION

Figure 1:
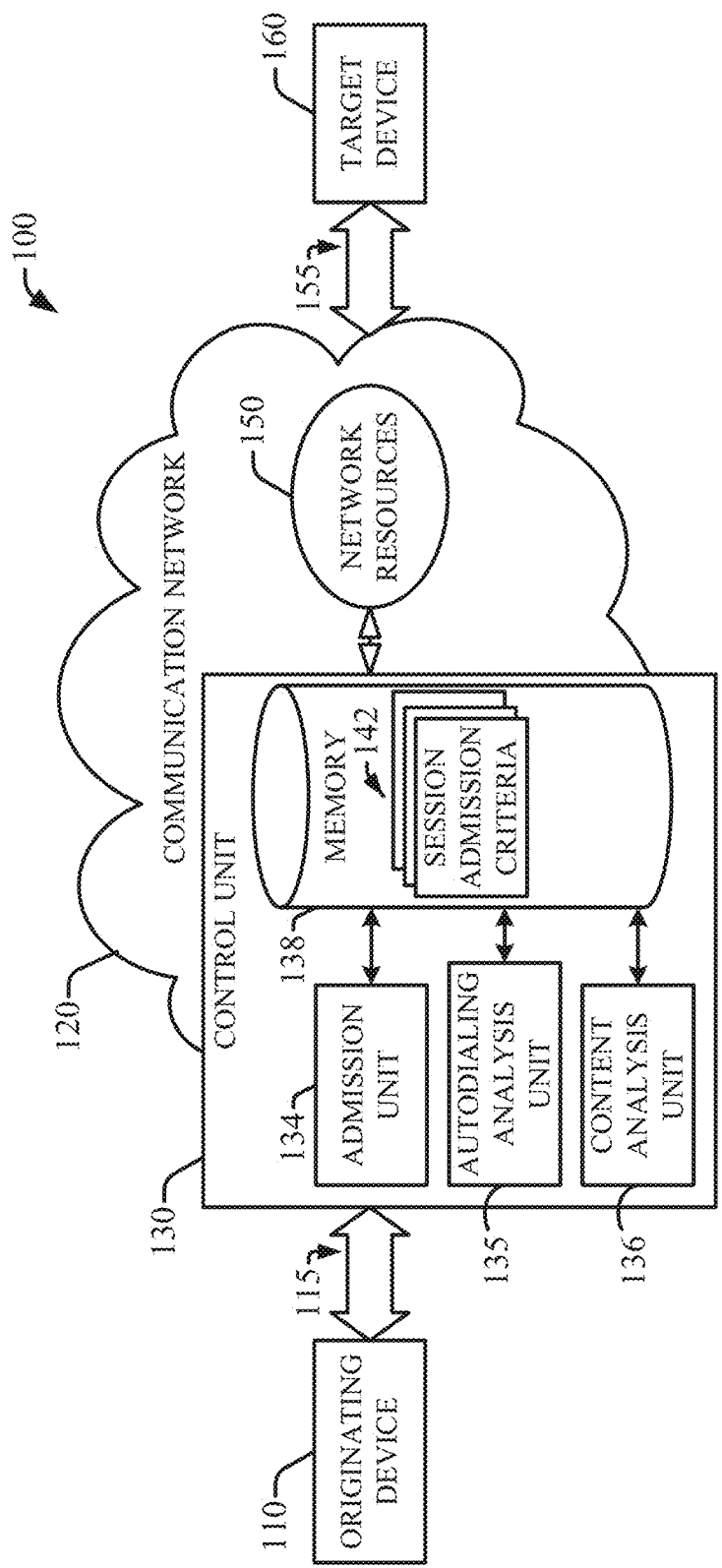
FIG. 1 is a block diagram of an example network environment.

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus comprise steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

The present disclosure describes methods and systems for admission control of a communication session over a communication network. Autodialing systems (e.g., robo-dialers) having one or more originating devices that establish communication sessions with target devices can be a nuisance to users of the target devices, can consume valuable resources on a communication network, and can be the source of fraud perpetrated against vulnerable users of the communication network. However, certain autodialing systems are beneficial or are otherwise permitted to use the communication network such as for political calls or call centers that make multiple calls to their customers.

A determination can be made that an originating device identifier associated with an originating device that originates a communication session is associated with an autodialing system. If the originating device identifier is associated with an autodialing system, a determination can be made whether the autodialing system is a valid autodialing system or an invalid autodialing system. If the autodialing system is an invalid autodialing system, then the originating device identifier can be added to a blocked list so that future communication sessions from the originating device are not processed by the communication service network.

A determination can be made whether an originating device identifier is an autodialing system or a possible autodialing system by comparing attributes of past communication sessions associated with the originating device identifier with a set of thresholds to identify suspected autodialing systems. For example, if one or more originating devices associated with an originating device identifier made a threshold number of calls during a threshold period of time and/or an answer seizure rate (ASR) was below a certain threshold, then the originating device identifier can be tagged for further analysis and/or declared an autodialing system.

Communication sessions associated with the tagged originating device identifier can be monitored. Content of the communication session can be further analyzed to determine whether the communication session originated from an autodialing system. For example, an active monitoring device can capture real-time protocol (RTP) packets from the communication session associated with the tagged originating device identifier. Audio data comparison of the content of two or more communication session can be performed to determine whether the two or more communication sessions substantially match. If the audio data from the two or more communication sessions substantially match, then the methods and systems of the present disclosure can classify the originating device identifier as being associated with an autodialing system.

A determination can be made whether the autodialing system is a valid autodialing system or an invalid autodialing system. The audio data of the communication session can be converted to text which can be compared by a computer system to a database of keywords that can be used to identify a valid autodialing system and/or an invalid autodialing system. The keywords can be indicative of a valid or an invalid autodialing system. For example, keywords with relation to political calls (e.g., a valid autodialing system) can comprise words of a political nature such as names of political parties, a name of a political candidate, "political primary," "election," "vote," combinations thereof, and the like. For example, keywords with relation to predatory lending calls (e.g., an invalid autodialing system) can comprise words of a financial nature such as "interest rate," "loan," "payment," "balance," combinations thereof, and the like. A match of one or more of these keywords can indicate to the computer system that the originating device identifier associated with the communication session is associated with a valid autodialing system and future communication sessions associated with the originating device identifier can be allowed to be processed on the communication service network. If the communication session comprises language that is not in the database of keywords that indicate a valid autodialing system or the communication session comprises language that is in a database of keywords that indicate an invalid autodialing system, then the computer system can add the originating device identifier to a blocked list and future communication sessions associated with the originating device identifier can be blocked.

Referring to the drawings, FIG. 1 illustrates a high-level block diagram of a network environment 100 in accordance with one or more aspects of the disclosure. As illustrated, the exemplary network environment 100 can comprise an originating device 110 functionally coupled (e.g., communicatively coupled via wired links or wireless links, or a combination thereof) to a communication network 120 which can comprise wireless networks, wireline networks, and any combination thereof. A data and signaling pipe 115 comprising an upstream link, or uplink (UL), and a downstream link, or downlink (DL), enables functional coupling among the originating device 110 and the communication network 120. The data and signaling pipe 115 can comprise a wireless link or wireline link, or a combination thereof. The originating device 110 can be embodied in or can comprise end-user equipment, such as a user device (mobile or otherwise) or most any customer premises equipment. Accordingly, the originating device 110 can be an electronic device that is part of a network (e.g., a telecommunication network, a home network, a utilities network, or combinations thereof) and has various levels of computational capability. For example, the originating device 110 can be at least one of a terminal display device, a set top box (STB), an internet protocol (IP)-enabled television, a personal computer, a portable computer, a telephone, a wearable computer, and so forth. The originating device 110 can comprise an originating device identifier (e.g., a metadata field, a hypermedia link, a phone number, a network address, etc.) that identifies the originating device 110. The originating device identifier can comprise a unique number that can be detected by an OID (Origination Identity) system. This unique number is referred to herein as an incoming call number.

In addition, the network environment 100 can also comprise a target device 160 functionally coupled to the communication network 120 via a data and signaling pipe 155, which can comprise a wireless link or wireline link, or a combination thereof. The target device 160 can comprise a target device identifier (e.g., a metadata field, a hypermedia link, a phone number, a network address, etc.) that identifies the target device 160. The target device identifier can comprise a unique number, referred to herein as a destination call number.

In an aspect, the originating device 110 can transmit a session initiation request to establish a communication session with the target device 160. To initiate and/or support a communication session, the originating device 110 and the target device 160 can exploit the communication network 120, with which the originating device 110 can communicate in accordance with various packet-switched (PS) communication protocols supported by such network. Similarly, the target device 160 also can communicate with the communication network 120 in accordance with various packet-switched (PS) communication protocols. For instance, the various packet-switched communication protocols can comprise one or more of an Ethernet protocol format; an internet protocol (IP) format, such as IPv4 and IPv6, or the like; a user datagram protocol (UDP) format; HTTP; simple object access protocol (SOAP); simple network management protocol (SNMP); SIP; or H.323 protocol.

In one or more embodiments one or more of the originating device 110 or the target device 160 can communicate (e.g., exchange information) with the communication network 120 according to non-PS communication protocols. For instance, the target device can be a POTS device, which can communicate with the service network 120 via a circuit-switched (CS) communication protocol.

The communication network 120 can comprise wireless networks, wireline networks, and any combination thereof, which can permit establishment (e.g., initiation, maintenance, initiation and maintenance, etc.) of a communication session. In an aspect, the communication network 120 can comprise one or more of wide area networks (WANs), one or more local area networks (LANs), Voice over IP (VoIP) networks, signaling networks (e.g., SS#7), real-time video over IP network, real-time multimedia network, and the like. Such networks can operate in accordance with most any communication protocol for wireline communication or wireless communication. In certain aspects, the communication network 120 can have several functional elements that can establish a backbone network, such as a high-capacity packet-switched network. In other aspects, the communication network 120 can have internal structure, with several functional elements that can establish at least two main operational blocks: a backbone network (e.g., a high-capacity packet-switched network) and a regional access network (RAN). The internal structure also can comprise functional elements that establish more spatially localized networks, such as local area networks, home area networks, or the like. Both the backbone network and the regional access network (RAN) can be WANs, for example, with the backbone network having a larger geographical scope than the RAN.

In an aspect, the originating device 110 can transmit a session initiation message (e.g., a VoIP session initiation message) to a control unit 130 (e.g., a session border controller (SBC) function or SBC) in order to initiate a communication session with the target device 160. The session initiation message can convey information (e.g., data and/or metadata) that identifies the originating device 110 and/or the target device 160. The control unit 130 can regulate allocation of network resources 150 that can be dedicated for the communication session. The network resources 150 can comprise one or more of bandwidth, communication channels (such as signaling channels), PDPs, processing resources, or the like. As illustrated, the control unit 130 can comprise an admission unit 134 functionally coupled to a memory 138. In an aspect, the memory 138 can be one or more databases and/or a third party database. The admission unit 134 can receive the session initiation message and can determine whether a record indicative of an originating device identifier of the originating device 110 (or a user associated with the originating device 110) is available in the memory 138, for example, in an admission control cache (e.g., OID Registry). The admission unit 134 can also receive the session initiation message and can determine whether a record indicative of a target device identifier associated with the target device 160 (or a user associated with the target device 160) is available in the memory 138, for example, in the admission control cache (e.g., Do Not Call registry). In a scenario in which such a record indicative of one or both of the originating device 110 and/or the target device 160 (or respective associated users) is available in the admission control cache—e.g., the record is cached—the admission unit 134 can apply at least one session admission criterion in order to permit or reject processing of the communication session. The at least one session admission criterion can be retained in one or more memory elements 142, labeled as session admission criteria. The at least one session admission criterion can be instructions on how the control unit 130 can handle (e.g., block, process) a communication session if an originating device identifier and/or a target device identifier is on a particular list/database (e.g., block list, exceptions list, "Do Not Call" registry, a tagged for analysis list).

In an aspect, the control unit 130 can comprise an autodialing analysis unit 135. The autodialing analysis unit 135 can be configured to determine whether an originating device identifier of one or more originating devices 110 is associated with a possible autodialing system and/or an autodialing system. For each communication session processed, a data record (e.g., a call detail record (CDR)) can be generated by the control unit 130 and stored in the memory 138. The data record can comprise one or more data entries including information about the communication session. The autodialing analysis unit 135 can monitor one or more attributes an answer seizure rate, a communication session rate, volume of communication sessions, and the like) of a plurality of data records of communication sessions associated with a particular originating device identifier. Based on the one or more attributes and one or more communication thresholds, the autodialing analysis unit 135 can determine whether an originating device identifier is associated with a possible autodialing system. The autodialing analysis unit 135 can determine whether an originating device identifier is associated with a possible autodialing system by comparing the one or more attributes to the one or more communication thresholds. If one or more attributes are above the one or more communication thresholds, then the originating device identifier can be associated with a possible autodialing system. For example, if a communication session rate exceeds a communication threshold of ten session initiation messages in the past five minutes, then the originating device identifier can be associated with a possible autodialing system. If the attributes indicate the originating device identifier is a possible autodialing system, the autodialing analysis unit 135 can tag; store the originating device identifier as a possible autodialing system. The autodialing analysis unit 135 can store a record in the admission control cache that the originating device identifier has been tagged for further analysis.

The control unit 130 can also comprise a content analysis unit 136. If the autodialing analysis unit 135 associates an originating device identifier as a possible autodialing system, the admission unit 134, based on the session admission criteria, can cause the control unit 130 to capture one or more communication sessions originating from originating devices 110 associated with a tagged originating device identifier. For example, the control unit 130 can be configured as an active monitoring device (e.g., a tap) and capture real-time transport packets (RTPs) of the communication session for a predefined number of communication sessions associated with the tagged originating device identifier. The content analysis unit 136 can be configured to analyze the captured communication sessions to further determine whether the originating device identifier, associated with the communication sessions, is associated with an autodialing system. For example, the content analysis unit 136 can compare the content of the captured communication session with content of a previously captured communication session associated with the same originating device identifier. The content analysis unit 136 can comprise an automatic content recognition module which can determine whether two or more communication sessions associated with the same originating device identifier comprise the same or substantially similar content. For example, the content analysis unit 136 can compare an acoustic fingerprint of the communication session to an acoustic fingerprint of one or more of the previously captured communication sessions.

If the tagged originating device identifier is associated with an autodialing system, then the content analysis unit 136 can determine whether the tagged originating device identifier is associated with a valid autodialing system or an invalid autodialing system. For example, the content analysis unit 136 can comprise a speech recognition module that can convert spoken words to text. The content analysis unit 136 can convert audio data in the captured communication sessions to text so that the text can be compared to a database of keywords that indicate whether the communication session is from a valid autodialing system or an invalid autodialing system. The session admission criteria can be updated by the content analysis unit 136 based on whether the originating device identifier is associated with a valid autodialing system or an invalid autodialing system.

Figure 2:
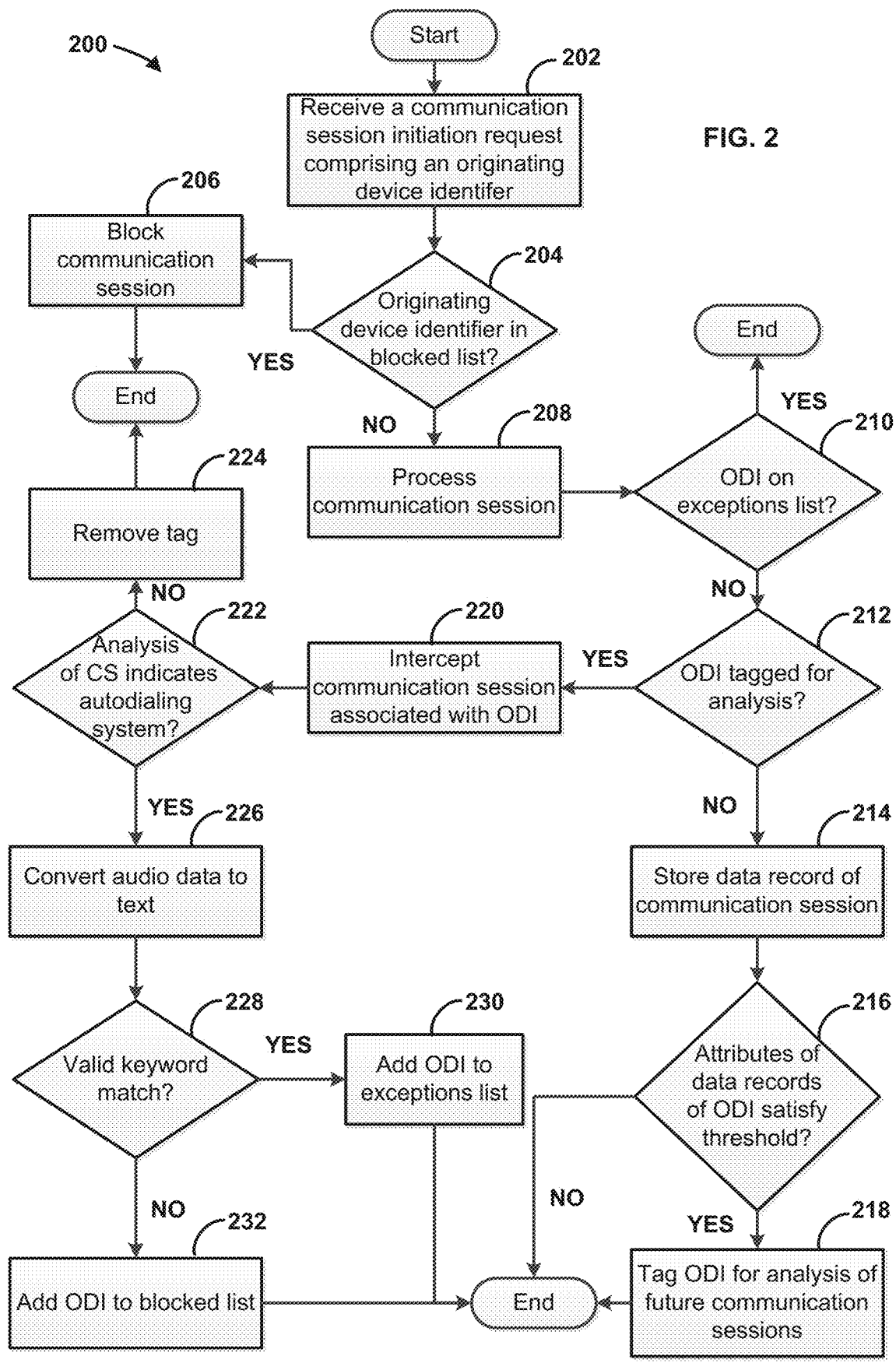
FIG. 2 is a flow chart of an example method.

FIG. 2 illustrates a flowchart of a method 200. In step 202, a session initiation request comprising an originating device identifier can be received. An originating device (e.g., the originating device 110 of FIG. 1) can transmit a session initiation message to a control unit (e.g., control unit 130 of FIG. 1) of a communication network (e.g., the communication network 120 of FIG. 1) in order to initiate a communication session with a target device (e.g., the target device 160 of FIG. 1). The session initiation message can convey information that identifies the originating device and/or the target device which can be referred to as an originating device identifier and a target device identifier, respectively.

In step 204, a determination can be made as to whether the originating device identifier of the session initiation request is on a blocked list of originating device identifiers. In an aspect, an admission unit (e.g., the admission unit 134 of FIG. 1) can make the determination. The admission unit can compare the originating device identifier of the session initiation request to originating device identifiers stored in the blocked list in a database (e.g., a memory 138 of FIG. 1). If the originating device identifier is found on the blocked list, then the method 200 can continue at step 206.

In step 206, each communication session associated with an originating device identifier that is identified as being from the blocked list can be blocked and the method 200 can end. The admission unit can block the communication session based on session admission criteria. The admission unit can block the communication session according to several examples. In one example, the admission unit can deny the session initiation request. In another example, the admission unit can route the communication session to an interactive voice response (IVR) system that completes the communication session. Having an IVR system complete the call can remove the impact on answer seizure rate. In yet another example, the communication session can be sent to one or more choke trunks to lessen the impact of the communication session on network resources. In yet another example, a message can be played back to the originating device indicating the communication session is blocked, which does not require a connect state to be reached (e.g., in session initiation protocol (SIP) the message can be sent at a 183 session progress state). In yet another example, the admission unit can cause a communication session on a blocked list to receive no response. In yet another example, the admission control unit can send a terminate response back to the originating device to terminate the communication session (e.g., in SIP, a 487 response code can be sent to the originating device).

Returning to step 204, if the originating device identifier is not on the blocked list, then the method 200 can continue at step 208. In step 208, a session initiation request can be processed and a communication session can be established.

In an aspect, the control unit can establish the communication session based on the determination by the admission unit that the originating device identifier is not on the blocked list.

In step 210, a determination can be made as to whether the originating device identifier is on an exceptions list. In an aspect, the admission unit can make the determination as to whether the originating device identifier is on the exceptions list or not. The admission unit can compare the originating device identifier of the session initiation request to originating device identifiers in the exceptions list stored in a database. If the originating device identifier is on an exceptions list, then the method 200 can end. If the originating device identifier is not on an exceptions list, then the method can continue at step 212.

In step 212, a determination can be made as to whether the originating device identifier is tagged for analysis. The admission unit can make the determination as to whether the originating device identifier is tagged for analysis. The admission unit can compare the originating device identifier of the session initiation request to originating device identifiers stored in a database of tagged originating device identifiers. If the originating device identifier is not tagged for analysis, then the method 200 can continue to step 214.

In step 214, a data record of the communication session can be stored in a database such as the memory (e.g., memory 138 of FIG. 1). For each communication session processed such as in step 208, a data record can be generated by the control unit and stored in the memory. The data record of the communication session can comprise various date entries relating to characteristics of the communication session. For example, the data record can comprise one or more of a originating device identifier, a target device identifier, a communication session duration, a communication session start time, a communication session end time, a data record identifier, a disposition of the communication session (e.g., whether the communication session was completed or not), a communication session type (e.g., voice call, short message service (SMS), and the like), any fault conditions, a header in a session initiation request (e.g., SIP INVITE, P-asserted identity or other headers), combinations thereof, and the like.

In step 216, a determination can be made as to whether one or more attributes from one or more data records associated with the originating device identifier satisfy one or more communication thresholds. An autodialing analysis unit (e.g., the autodialing analysis unit 135 of FIG. 1) can monitor the database of data records and determine one or more attributes of one or more data records stored that are associated with the originating device identifier. The one or more attributes can comprise a success-to-failure ratio for several communication sessions originating from an originating device associated with the originating device identifier, a total number of communication sessions originating from an originating device associated with the originating device identifier, a communication session rate (e.g., 10 communication sessions in the last 5 minutes), average communication session duration, answer seizure rate (ASR), whether a target device identifier is valid, whether an originating device identifier is valid, whether the target device identifiers of one or more communication sessions are consecutive target device identifiers, a threshold number of customer complaints, combinations thereof, and the like.

In an aspect, the autodialing analysis unit can compare the one or more attributes to the one or more session admission criteria stored in the memory. The one or more session admission criteria can comprise one or more communication thresholds for each attribute and/or combination of attributes. If the one or more communication thresholds are met for the one or more attributes, then, in step 218, the autodialing analysis unit can tag the originating device identifier for further analysis on future communication sessions. The autodialing analysis unit can store the tagged originating device identifier in the database of tagged originating device identifiers that the admission unit references in step 212. Returning to step 216, if one or more attributes do not satisfy the one or more communication thresholds, then the method 200 can end. In an aspect, the autodialing analysis unit can determine whether the originating device identifier associated with the one or more data records is an autodialing system based on the one or more attributes associated with the originating device identifier.

Returning to step 212, if the originating device identifier is determined to be tagged, then the method 200 can continue to step 220. In step 220, the communication session that has been processed can be intercepted for further analysis to determine whether the originating device identifier is associated with an autodialing system. The control unit can comprise an active monitoring device that can capture the content of the communication session. For example, the control unit can receive RTP packets of the communication session. In other examples the control unit can capture protocols of video chat and text over session protocols.

In step 222, an analysis of the content of the communication session can be performed to determine whether the originating device identifier is associated with an autodialing system. The content of the communication session can be analyzed by a content analysis unit (e.g., the content analysis unit 136 of FIG. 1) to determine whether the content of the communication session indicates that originating device is associated with an autodialing system. For example, the content analysis unit can compare the content of the captured communication session with content of a previously captured communication session associated with the same originating device identifier. The content analysis unit can determine whether two or more communication sessions associated with the same originating device identifier comprise the same or substantially similar content. For example, the content analysis unit can compare an acoustic fingerprint of the communication session to an acoustic fingerprint of one or more of the previously captured communication sessions through an automatic content recognition module. If the content is the same or substantially similar, the originating device identifier can be classified as being associated with an autodialing system. If the content is not the same, the originating device identifier can be classified as not being associated with an autodialing system. In an aspect, if the content analysis unit determines that the originating device identifier is not associated with an autodialing system, then the tag can be removed (e.g., the originating device identifier can be removed from the database of tagged originating device identifiers) from the originating device identifier in step 224 and the method 200 can end. In another aspect, further analysis can be performed on the content of the captured communication session to determine whether there is fraud or illegitimate use of a service network. Fraud identification can be completed externally to the control unit. Reports and other details (e.g., CDRs, audio files, and the like) can be generated and transmitted to a fraud group. The fraud group can determine whether fraudulent activity has occurred. The control unit can block future communication sessions if there is an indication of fraud of communication sessions associated with the originating device identifier.

Returning to step 222, if the originating device identifier is determined to be associated with an autodialing system, then, in step 226, audio data of the content captured can be converted to text. For example, the content analysis unit can comprise a speech recognition module that can convert spoken words to text. Voice data captured in the RTP packet can be converted to text.

In step 228, the content analysis unit can compare the text from the converted audio data to data entries stored in a database of keywords. The data entries can comprise keywords that indicate a valid autodialing system and/or an invalid autodialing system. For example, certain types of communication sessions such as political communication sessions, even if the communication sessions originate from an autodialing system, should not be blocked by a service provider. Other examples of communication sessions that should not be blocked even if the communication sessions originate from an autodialing system are calls from schools, pharmacies, reverse 911 calls, emergency notifications, website and email voice password authentication messages, banking notifications on fraud, government notifications, and the like. The autodialing systems that should not be blocked can be referred to as valid autodialing systems. The data entries can comprise keywords that denote a communication session that should not be blocked. For example, the keywords can comprise valid keywords such as a political party name, a candidate name, "political primary," "election," "vote," "emergency," "alert," combinations thereof, and the like. The keywords can comprise invalid keywords or phrases such as "You have won," "credit card services," "IRS," combinations thereof, and the like. Valid keywords can be negotiated with banks, financial institutions, government, and other valid customers that can be spoofed. Adding certain keywords to these customers can reduce the chance of spoofing where an invalid autodialing system can mimic a valid customer to get the communication session through. If the content analysis unit determines that the communication session originated from a valid autodialing system, then the content analysis unit can add the originating device identifier to the exceptions list in step 230. For example, if the content analysis unit determines that the text of converted audio data of the communication session associated with the originating device identifier matches valid keywords or does not match invalid key words, then the originating device identifier can be added to the exceptions list and/or not added to the block list. If the content analysis unit determines that the communication session originated from an invalid autodialing system, then the content analysis unit can add the originating device identifier to the blocked list in step 232. For example, if the content analysis unit determines that the text of the communication session associated with the originating device identifier matches invalid keywords or does not match valid key words, then the originating device identifier can be added to the blocked list and/or not added to the exceptions list. The method 200 can then end and the control unit can wait to receive a new session initiation request.

FIG. 3 illustrates a method 300 for admission control of a communication session on a communication network. In step 302, one or more attributes of a plurality of communication sessions initiated by an originating device associated with an originating device identifier can be determined. Determining one or more attributes of the plurality of communication session can be performed by a control unit comprising an autodialing analysis unit (e.g., autodialing analysis unit 135 of FIG. 1). The one or more attributes can comprise one or more of an answer seizure rate threshold, a call rate threshold, and a call hold time threshold. A data record of a communication session of the plurality of communication sessions can be stored in a database such as the memory. For each communication session processed, a data record can be generated by the control unit and stored in the memory. The data record of the communication session can comprise various date entries relating to characteristics of the communication session. For example, the data record can comprise one or more of a originating device identifier, a target device identifier, a communication session duration, a communication session start time, a communication session end time, a data record identifier, a disposition of the communication session, a communication session type, any fault conditions, combinations thereof, and the like.

The autodialing analysis unit can monitor the database of data records and determine one or more attributes of one or more data records stored that are associated with the originating device identifier based on the data entries of the data records. The one or more attributes can comprise a success-to-failure ratio for several communication sessions originating from an originating device associated with the originating device identifier, a total number of communication sessions originating from an originating device associated with the originating device identifier, a communication session rate, an average communication session duration, an ASR, combinations thereof, and the like.

In step 304, it can be determined whether the originating device identifier is associated with an autodialing system based on the one or more attributes. A determination can be made, based on the one or more attributes, that the originating device identifier is associated with an autodialing system. The autodialing analysis unit can determine whether one or more attributes from one or more data records associated with the originating device identifier satisfy one or more communication thresholds. For example, the autodialing analysis unit can compare the one or more attributes to one or more session admission criteria stored in the memory. The one or more session admission criteria can comprise one or more communication thresholds for each attribute and/or combination of attributes. If the one or more communication thresholds are met for the one or more attributes, then the autodialing analysis unit can tag the originating device identifier as a possible autodialing system and tag the originating device for further analysis on future communication sessions. The autodialing analysis unit can store the tagged originating device identifier in a database of tagged originating device identifiers that an admission unit references. In an aspect, the autodialing analysis unit can determine whether the originating device identifier associated with the one or more data records is an autodialing system based on the one or more attributes associated with the originating device identifier.

In step 306, text data can be generated from audio data of at least one communication session initiated by the originating device, in response to determining that the originating device identifier is associated with an autodialing system. Communication sessions from a tagged originating device identifier can be further analyzed by capturing content of the communication sessions and analyzing the audio data of the content of at least two communication sessions associated with the tagged originating device identifier. The control unit can comprise an active monitoring device that can capture the content of a communication session. For example, the control unit can receive RTP packets of the communication session. A content analysis unit (e.g., content analysis unit 136 of FIG. 1) can determine whether at least a threshold portion of the audio data of the at least two communication session matches. If at least the threshold portion of the audio data matches between the at least two communication sessions, then the tagged originating device identifier can be associated as originating from an autodialing system. In another example, the content analysis unit can determine an originating device belongs to an autodialing system if the originating device can perform an interactive communication session. The content analysis unit can be configured to interact with the originating device and determine the originating device is an autodialing system based on other criteria such as a period of time of a pause between a first response from the content analysis and/or target device to a statement presented by the originating device to a second response from the originating device to the content analysis and/or target device. The second response and/or pause can be similar between communication session originating from the originating device.

In step 308, if the originating device identifier is associated with an autodialing system, a determination can be made whether the autodialing system associated with the originating device identifier is an invalid autodialing system. A determination can be made that the autodialing system is invalid based on a comparison of the text data to a database of keywords that indicate whether the at least one communication session is from a valid autodialing system or an invalid autodialing system. The content analysis unit can further determine whether an originating device identifier that is associated with an autodialing system is associated with an invalid autodialing system or a valid autodialing system. If the originating device identifier is associated with an invalid autodialing system, then the originating device identifier can be stored in a database of invalid autodialing systems such as a blocked list.

FIG. 4 illustrates a method 400 of determining whether the originating device identifier of step 308 of FIG. 3 and step 506 of FIG. 5 is associated with a valid autodialing system or an invalid autodialing system. In step 402, at least one communication session initiated by the one or more originating devices associated with the originating device identifier can be intercepted. The control unit can comprise an active monitoring device that can capture the content of the communication session. For example, the control unit can receive RTP packets of the communication session.

In step 404, audio data of the at least one communication session can be converted to text data. The content of the communication session can comprise audio data. The audio data can comprise voice data. The content analysis unit can comprise a speech recognition module that can convert spoken words to text. The voice data captured in the RTP packet can be converted to text data by the speech recognition module.

In step 406, a comparison can be performed of the text data of the at least one communication session to a database of keywords. The keywords can indicate whether the at least one communication session is from a valid autodialing system or an invalid autodialing system. The content analysis unit can compare the text data from the converted audio data to data entries stored in a database of keywords. The data entries can comprise keywords that indicate a valid autodialing system and/or an invalid autodialing system. For example, certain types of communication sessions such as political communication sessions, even if the communication sessions originate from an autodialing system, should not be blocked by a service provider. The autodialing systems that should not be blocked can be referred to as valid autodialing systems. The data entries can comprise keywords that denote a communication session that should not be blocked. For example, the keywords can comprise a political party name, a candidate name, "political primary", "election", "vote", combinations thereof, and the like. If the content analysis unit determines that the communication session originated from a valid autodialing system, then the content analysis unit can add the originating device identifier to an exceptions list. For example, if the content analysis unit determines that the text data of converted audio data of the communication session associated with the originating device identifier matches valid keywords or does not match invalid key words, then the originating device identifier can be added to the exceptions list and/or not added to the block list. If the content analysis unit determines that the communication session originated from an invalid autodialing system, then the content analysis unit can add the originating device identifier to the blocked list. For example, if the content analysis unit determines that the text of the communication session associated with the originating device identifier matches invalid keywords or does not match valid keywords, then the originating device identifier can be added to the blocked list and/or not added to the exceptions list.

Returning to FIG. 3, in step 310, in response to determining that the autodialing system is an invalid autodialing system, one or more future communication sessions associated with the originating device identifier can be blocked. The determination that the originating device identifier is to be associated with an invalid autodialing system can be based on the comparison of the text data of the at least one communication session to the database of the keywords. The admission unit that receives a future communication session can compare an originating device identifier that is associated with the communication session to originating device identifiers on the blocked list and the exceptions list to determine whether to process the communication session.

In an aspect, the originating device identifier can be determined to be associated with valid autodialing system. The one or more future communication sessions from the one or more originating devices associated with the originating device identifier can be processed if the originating device identifier is determined to be associated with a valid autodialing system. The one or more future communication sessions associated with the originating device identifier can be processed if the originating device identifier is determined to be associated with a valid autodialing system based on the comparison of the text data of the at least one communication session to the database of the keywords.

In an aspect, the method 300 can receive a communication session associated with the originating device identifier. Whether the originating device identifier is stored in a database of invalid autodialing systems (e.g., the blocked list) can be determined. The communication session can be blocked if the originating device identifier is stored on the database of invalid autodialing systems. At various stages of the method 300, at least one communication session can be analyzed for fraud. For example if the originating device identifier associated with the at least one communication session is determined to be an invalid autodialing system, the at least one communication session can be analyzed for fraud.

FIG. 5 illustrates a method 500 for admission control of a communication session. In step 502, one or more attributes of a plurality of communication sessions initiated by one or more originating devices associated with an originating device identifier can be determined. Determining one or more attributes of the plurality of communication session can be performed by a control unit comprising an autodialing analysis unit. A data record of a communication session of the plurality of communication sessions can be stored in a database such as the memory. For each communication session processed, a data record can be generated by the control unit and stored in the memory. The data record of the communication session can comprise various date entries relating to characteristics of the communication session. For example, the data record can comprise one or more of a originating device identifier, a target device identifier, a communication session duration, a communication session start time, a communication session end time, a data record identifier, a disposition of the communication session, a communication session type, any fault conditions, combinations thereof, and the like.

The autodialing analysis unit can monitor the database of data records and determine one or more attributes of one or more data records stored that are associated with the originating device identifier. The one or more attributes can comprise a success-to-failure ratio for several communication sessions originating from an originating device associated with the originating device identifier, a total number of communication sessions originating from an originating device associated with the originating device identifier, a communication session rate, average communication session duration, combinations thereof, and the like.

In step 504, whether the originating device identifier is associated with an autodialing system can be determined based on the one or more attributes. The autodialing analysis unit can determine whether one or more attributes from one or more data records associated with the originating device identifier satisfy one or more communication thresholds. For example, the autodialing analysis unit can compare the one or more attributes to one or more session admission criteria stored in the memory. The one or more session admission criteria can comprise one or more communication thresholds for each attribute and/or combination of attributes. Examples of attributes that can have one or communication thresholds can comprise ASR, NER, average call duration, call frequency, invalid source numbers, invalid authentication header content. If the one or more communication thresholds are met for the one or more attributes, then the autodialing analysis unit can tag the originating device identifier as a possible autodialing system and tag the originating device for further analysis on future communication sessions. The autodialing analysis unit can store the tagged originating device identifier in a database of tagged originating device identifiers that an admission unit references. In an aspect, the autodialing analysis unit can determine whether the originating device identifier associated with the one or more data records is an autodialing system based on the one or more attributes associated with the originating device identifier.

Communication sessions from a tagged originating device identifier can be further analyzed by capturing content of the communication sessions and analyzing the audio data of the content of at least two communication sessions associated with the tagged originating device identifier. The control unit can comprise an active monitoring device that can capture the content of a communication session. For example, the control unit can receive RTP packets of the communication session. A content analysis unit can determine whether at least a threshold portion of the audio data of the at least two communication session matches. If at least a threshold of the audio data matches between the at least two communication sessions, then the tagged originating device identifier can be associated as originating from an autodialing system.

In step 506 whether the autodialing system associated with the originating device identifier is a valid autodialing system if the originating device identifier is associated with an autodialing system can be determined. The content analysis unit can further determine whether an originating device identifier that is associated with an autodialing system is associated with an invalid autodialing system or a valid autodialing system. If the originating device identifier is associated with a valid autodialing system, then the originating device identifier can be stored in a database of valid autodialing systems such as an exceptions list. Method 400 above in the description of FIG. 4 further illustrates how the content analysis unit determines whether an originating device identifier is associated with an autodialing system that is an invalid autodialing system or a valid autodialing system.

In step 508, one or more future communication sessions associated with the originating device identifier can be processed if the originating device identifier is determined to be associated with a valid autodialing system. The originating device identifier can be determined to be associated with a valid autodialing system based on the comparison of the text data of the at least one communication session to the database of the keywords. The admission unit that receives a future communication session can compare an originating device identifier that is associated with the communication session to originating device identifiers on the blocked list and the exceptions list to determine whether to process the communication session. The one or more future communication sessions can be determined to be on the exceptions list and the one or more future communication sessions associated with the originating device identifier can be processed.

In an aspect, if the originating device identifier is determined to be associated with an invalid autodialing system, the one or more future communication sessions associated with the originating device identifier can be blocked. The originating device identifier can be added to a blocked list. The admission unit can block the one or more future communication sessions based on session admission criteria. The admission unit can block the one or more future communication sessions according to several examples. In one example, the admission unit can deny the session initiation request. In another example, the admission unit can route the one or more future communication sessions to an IVR system that completes the one or more future communication sessions. Having an IVR system complete the call can remove the impact on answer seizure rate. In yet another example, the one or more future communication sessions can be sent to one or more choke trunks to lessen the impact of the one or more future communication sessions on network resources.

In an aspect, at various stages of the method 300, at least one communication session can be analyzed for fraud. For example if the originating device identifier associated with the at least one communication session is determined to be an invalid autodialing system, the at least one communication session can be analyzed for fraud.

FIG. 6 illustrates a method 600 for admission control of a communication session. In step 602, a plurality of communication sessions initiated by an originating device associated with an originating device identifier can be processed. A control unit (e.g., the control unit 130 of FIG. 1) can receive the plurality of communication sessions. An admission unit can determine whether to process a communication session of the plurality of communication sessions. The admission unit can compare an originating device identifier associated with the communication session to a blocked list. If the originating device identifier is not in the blocked list the communication session can be processed.

In step 604, a determination can be made that a communication threshold for the originating device identifier has been satisfied based on analyzing a data record comprising one or more attributes for each of the plurality of communication sessions. The one or more attributes can comprise one or more of an answer seizure rate threshold, a call rate threshold, and a call hold time threshold. A data record of a communication session of the plurality of communication sessions can be stored in a database such as the memory. For each communication session processed, a data record can be generated by the control unit and stored in the memory. The data record of the communication session can comprise various date entries relating to characteristics of the communication session. For example, the data record can comprise one or more of a originating device identifier, a target device identifier, a communication session duration, a communication session start time, a communication session end time, a data record identifier, a disposition of the communication session, a communication session type, any fault conditions, combinations thereof, and the like.

The control unit can monitor the database of data records and determine one or more attributes of one or more data records stored that are associated with the originating device identifier. The one or more attributes can comprise a success-to-failure ratio for several communication sessions originating from an originating device associated with the originating device identifier, a total number of communication sessions originating from an originating device associated with the originating device identifier, a communication session rate, average communication session duration, combinations thereof, and the like.

It can be determined whether a communication threshold for an originating device identifier of the one or more originating device identifiers has been satisfied. The communication threshold can comprise one or more of an answer seizure rate threshold, a call rate threshold, and a call hold time threshold. In an aspect, the one or more attributes can be used to determine that a communication session associated with the originating device identifier is a possible invalid communication session and the originating device identifier can be tagged for further analysis of communications sessions associated with the originating device identifier.

In step 606, audio content from one or more of the plurality of communication sessions associated with the originating device identifier can be retrieved if the communication threshold has been satisfied. Audio content from one or more of the plurality of communication session can be retrieved. Communication sessions from the tagged originating device identifier can be further analyzed by capturing content of the communication sessions and analyzing the audio data of the content of at least two communication sessions associated with the originating device identifier. The one or more communication sessions can comprise RTP packets that can be intercepted. The RTP packets can comprise content such as audio content. Whether at least a threshold portion of the audio data of the at least two communication session matches can be determined. If at least a threshold of the audio data matches between the at least two communication sessions, then the originating device identifier can be associated as originating from an originating device that originates invalid communication sessions.

In step 608, the audio content can be converted to text data. The content of the communication session can comprise audio data. The audio data can comprise a voice data. The content analysis unit can comprise a speech recognition module that can convert spoken words in the voice data to text. Voice data captured in the RTP packet can be converted to text data by the speech recognition module.

The text data can be compared to a database of keywords. The keywords can indicate whether a communication session is a valid communication session or an invalid communication session. A determination can be made that the communication session is invalid based on the comparison. A content analysis unit can compare the text data from the converted audio data to data entries stored in a database of keywords. The data entries can comprise keywords that indicate a valid communication session and/or an invalid communication. For example, certain types of communication sessions such as political communication sessions should not be blocked by a service provider. The communication sessions that should not be blocked can be referred to as valid communication sessions. The data entries can comprise keywords that denote a communication session that should not be blocked. For example, the keywords can comprise a political party name, a candidate name, "political primary", "election". "vote", combinations thereof, and the like. If the content analysis unit determines that the communication session is a valid communication session, then the content analysis unit can add the originating device identifier to an exceptions list. For example, if the content analysis unit determines that the text data of converted audio data of the communication session associated with the originating device identifier matches valid keywords or does not match invalid key words, then the originating device identifier can be added to the exceptions list and/or not added to the block list. If the content analysis unit determines that the communication session is an invalid communication session, then the content analysis unit can add the originating device identifier to the blocked list. For example, if the content analysis unit determines that the text of the communication session associated with the originating device identifier matches invalid keywords or does not match valid keywords, then the originating device identifier can be added to the blocked list and/or not added to the exceptions list.

In step 610, one or more future communication sessions associated with the originating device identifier can be blocked if comparing the text data to the database of the keywords indicates the one or more communication sessions are invalid communication sessions. Responsive to determining that the communication session is invalid, one or more future communication sessions associated with the originating device identifier can be blocked. In an aspect, if the originating device identifier is determined to be associated with invalid communication sessions, the one or more future communication sessions associated with the originating device identifier can be blocked. The admission unit can block the one or more future communication sessions based on session admission criteria. The admission unit can block the one or more future communication sessions according to several examples. In one example, the admission unit can deny the session initiation request. In another example, the admission unit can route the one or more future communication sessions to an IVR system that completes the one or more future communication sessions. Having an IVR system complete the call can remove the impact on answer seizure rate. In yet another example, the one or more future communication sessions can be sent to one or more choke trunks to lessen the impact of the one or more future communication sessions on network resources.

In an aspect, the originating device identifier can be determined to be associated with valid communication sessions. The one or more future communication sessions from the one or more originating devices associated with the originating device identifier can be processed if the originating device identifier is determined to be associated with valid communication sessions. The one or more future communication sessions associated with the originating device identifier can be processed if the originating device identifier is determined to be associated with a valid communication sessions based on the comparison of the text data of the at least one communication session to the database of the keywords.

FIG. 7 illustrates a method 700 for admission control of a communication session. In step 702, a first communication session initiation request comprising an originating device identifier can be received. The first communication session initiation request can be transmitted by an originating device associated with the originating device identifier. A control unit can receive the first communication session initiation request.

In step 704, the first communication session initiation request can be processed to establish a first communication session between the originating device associated with the originating device identifier and a target device. An admission unit can determine whether the control unit is to process the f communication session. The admission unit can compare an originating device identifier associated with the communication session to a blocked list. If the originating device identifier is not in the blocked list the communication session can be processed.

In step 706, a data record of the first communication session can be stored. The data record can comprise one or more data entries of information about the first communication session between the originating device and the target device. The data record of the first communication session can be stored in a database such as the memory. For each communication session processed, a data record can be generated by the control unit and stored in the memory. The data record of the first communication session can comprise various date entries relating to characteristics of the communication session. For example, the data record can comprise one or more of a originating device identifier, a target device identifier, a communication session duration, a communication session start time, a communication session end time, a data record identifier, a disposition of the communication session, a communication session type, any fault conditions, combinations thereof, and the like In step 708, one or more attributes relating to the originating device identifier can be determined based on the one or more data entries of the data record. The control unit can monitor the database of data records and determine one or more attributes of one or more data records stored that are associated with the originating device identifier. The one or more attributes can comprise a success-to-failure ratio for several communication sessions originating from an originating device associated with the originating device identifier, a total number of communication sessions originating from an originating device associated with the originating device identifier, a communication session rate, average communication session duration, whether a target device identifier is valid, whether an originating device identifier is valid, whether the target device identifiers of one or more communication sessions are consecutive target device identifiers, a threshold number of customer complaints, combinations thereof, and the like.

In step 710, it can be determined whether the one or more attributes satisfy a communication threshold that indicates the originating device identifier is associated with a possible autodialing system. A determination can be made that the one or more attributes satisfy a communication threshold. The communication threshold can indicate that the originating device identifier is associated with a possible autodialing system. In an aspect, an autodialing analysis unit can compare the one or more attributes to the one or more session admission criteria stored in the memory. The one or more session admission criteria can comprise one or more communication thresholds for each attribute and/or combination of attributes. The communication threshold can comprise one or more of an answer seizure rate threshold, a call rate threshold, a call hold time threshold, and the like.

In step 712, the originating device identifier can be tagged as a possible autodialing system if the one or more attributes satisfy the communication threshold. Responsive to determining that the one or more attributes satisfy a communication threshold, the originating device identifier can be tagged as a possible autodialing system if one or more communication thresholds are met for the one or more attributes, then the autodialing analysis unit can tag the originating device identifier for further analysis on future communication sessions. The autodialing analysis unit can store the tagged originating device identifier in the database of tagged originating device identifiers that the admission unit can reference to determine whether to further analyze a communication session associated with an originating device identifier.

In an aspect, a second communication session initiation request comprising the originating device identifier can be received. The second communication session initiation request can be processed to establish a second communication session between an originating device associated with the originating device identifier and a target device. The admission unit can determine whether the originating device identifier is tagged as being associated with a possible autodialing system. The control unit can intercept the second communication session if the originating device identifier is tagged as being associated with a possible autodialing system. The control unit can capture audio data of such as the RTP packets of the second communication session. An autodialing analysis unit can determine whether the originating device identifier is associated with an autodialing system based on at least the second communication session. The autodialing analysis unit can compare audio data of the second communication session to audio data of at least one other communication session associated with the originating device identifier and determine whether at least a threshold portion of the audio data of the second communication session and the audio data of the at least one other communication session matches. If a threshold portion matches, then the originating device identifier can be determined to be associated with an autodialing system.

The originating device identifier can then be determined to be associated with an invalid autodialing system or a valid autodialing system if the originating device is associated with an autodialing system. A content analysis unit can convert audio data of the second communication session to text data. The content analysis unit can then perform a comparison of the text data of the second communication session to a database of keywords that indicate whether the second communication session is from a valid autodialing system or an invalid autodialing system. If the second communication session is from an invalid autodialing system, then one or more future communication sessions associated with the originating device identifier can be blocked. If the originating device identifier is associated with a valid autodialing system, then the originating device identifier can be added to an exceptions list.

The one or more future communication sessions associated with the originating device identifier can route the one or more future communication sessions to an IVR system. The one or more future communication sessions with the IVR system can be completed.

Figure 8:
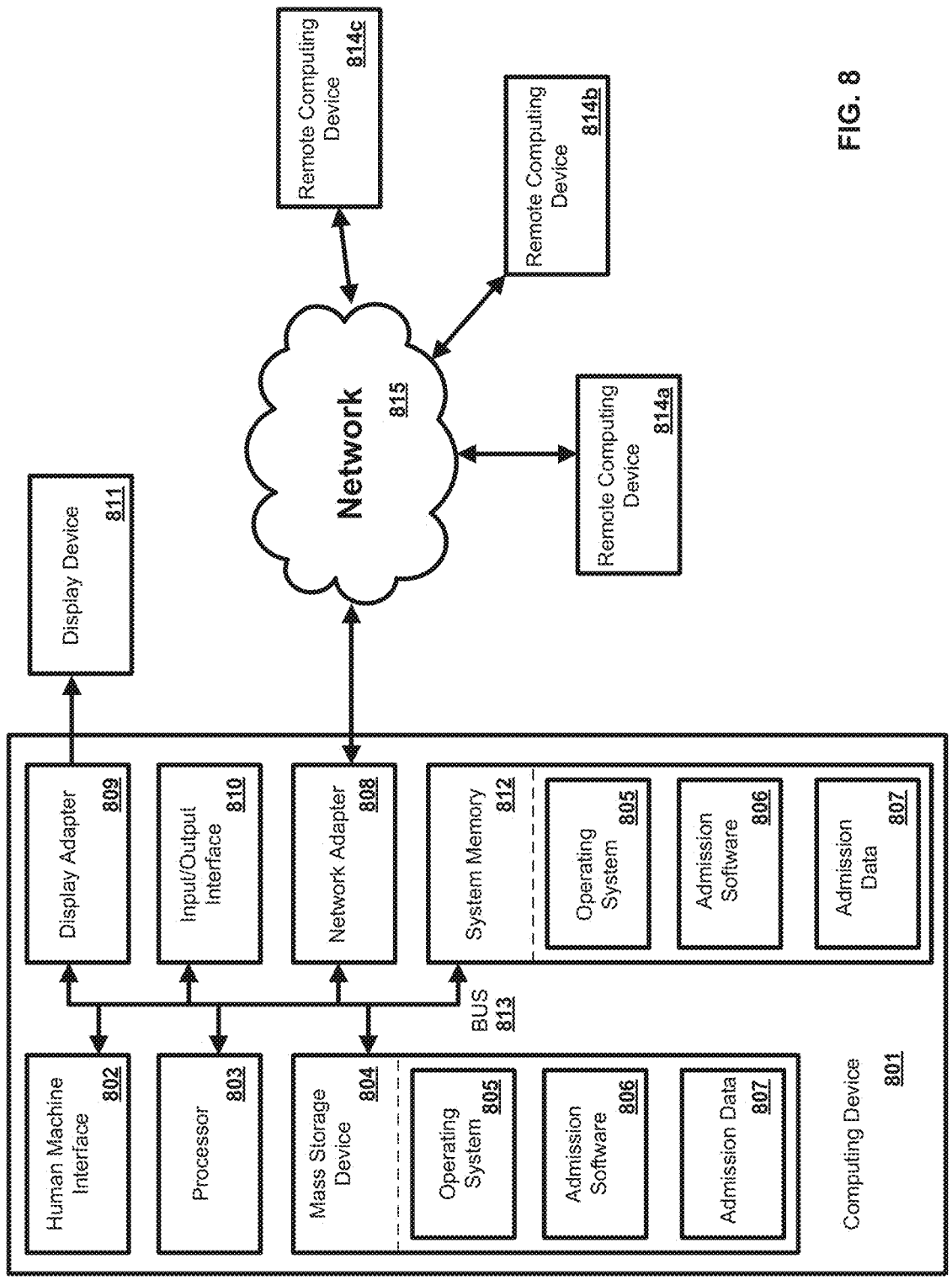
FIG. 8 is a block diagram of an exemplary computing device.

In an exemplary aspect, the methods and systems can be implemented on a computing system such as computing device 801 as illustrated in FIG. 8 and described below. By way of example, a control unit 130 of a service network 120 of FIG. 1 can be a computing device as illustrated in FIG. 8. Similarly, the methods and systems disclosed can utilize one or more computers to perform one or more functions in one or more locations. FIG. 8 is a block diagram illustrating an exemplary operating environment for performing the disclosed methods. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The present methods and systems can be operational with numerous other general purpose or special purpose computing system environments or configurations. Examples of well known computing systems, environments, and/or configurations that can be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

Further, one skilled in the art will appreciate that the systems and methods disclosed herein can be implemented via a general-purpose computing device in the form of a computing device 801. The components of the computing device 801 can comprise, but are not limited to, one or more processors or processing units 803, a system memory 812, and a system bus 813 that couples various system components including the processing unit 803 to the system memory 812. In the case of multiple processing units 803, the system can utilize parallel computing.

The system bus 813 represents one or more of several possible types of bus structures, including a memory bus or memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus 813, and all buses specified in this description can also be implemented over a wired or wireless network connection and each of the subsystems, including the processing unit 803, a mass storage device 804, an operating system 805, admission software 806, admission data 807, a network adapter 808, system memory 812, an Input/Output Interface 810, a display adapter 809, a display device 811, and a human machine interface 802, can be contained within one or more remote computing devices 814*a,b,c* at physically separate locations, connected through buses of this form, in effect implementing a fully distributed system.

The computing device 801 typically comprises a variety of computer readable media. Exemplary readable media can be any available media that is accessible by the computing device 801 and comprises, for example and not meant to be limiting, both volatile and non-volatile media, removable and non-removable media. The system memory 812 comprises computer readable media in the form of volatile memory, such as random access memory (RAM), and/or non-volatile memory, such as read only memory (ROM). The system memory 812 typically contains data, such as admission data 807, and/or program modules, such as operating system 805 and admission software 806 that are immediately accessible to and/or are presently operated on by the processing unit 803.

In another aspect, the computing device 801 can also comprise other removable/non-removable, volatile/non-volatile computer storage media. By way of example, FIG. 8 illustrates a mass storage device 804 which can provide non-volatile storage of computer code, computer readable instructions, data structures, program modules, and other data for the computing device 801. For example and not meant to be limiting, a mass storage device 804 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 804, including by way of example, an operating system 805 and admission software 806. Each of the operating system 805 and admission software 806 (or some combination thereof) can comprise elements of the programming and the admission software 806 Admission data 807 can also be stored on the mass storage device 804. Admission data 807 can be stored in any of one or more databases known in the art. Examples of such databases comprise, DB2®, Microsoft® Access, Microsoft® SQL Server, Oracle®, mySQL, PostgreSQL, and the like. The databases can be centralized or distributed across multiple systems.

In another aspect, the user can enter commands and information into the computing device 801 via an input device (not shown). Examples of such input devices comprise, but are not limited to, a keyboard, pointing device (e.g., a "muse"), a microphone, a joystick, a scanner, visual systems, such as Microsoft's Kinect, audio systems that process sound such as music or speech, a traditional silver remote control, tactile input devices such as gloves, touch-responsive screen, body coverings, and the like These and other input devices can be connected to the processing unit 803 via a human machine interface 802 that is coupled to the system bus 813, but can be connected by other interface and bus structures, such as a parallel port, game port, an IEEE 1394 Port (also known as a Firewire port), a serial port, or a universal serial bus (USB).

In yet another aspect, a display device 811 can also be connected to the system bus 813 via an interface, such as a display adapter 809. It is contemplated that the computing device 801 can have more than one display adapter 809 and the computing device 801 can have more than one display device 811. For example, a display device can be a monitor, an LCD (Liquid Crystal Display), or a projector. In addition to the display device 811, other output peripheral devices can comprise components such as speakers (not shown) and a printer (not shown) which can be connected to the computing device 801 via Input/Output Interface 810. Any step and/or result of the methods can be output in any form to an output device. Such output can be any form of visual representation, including, but not limited to, textual, graphical, animation, audio, tactile, and the like. The display device 811 and computing device 801 can be part of one device, or separate devices.

The computing device 801 can operate in a networked environment using logical connections to one or more remote computing devices 814a,b,c. By way of example, a remote computing device can be a personal computer, portable computer, a smartphone, a server, a router, a network computer, a peer device or other common network node, and so on. Logical connections between the computing device 801 and a remote computing device 814a,b,c can be made via a network 815, such as a local area network (LAN) and a general wide area network (WAN). Such network connections can be through a network adapter 808. A network adapter 808 can be implemented in both wired and wireless environments. Such networking environments are conventional and commonplace in dwellings, offices, enterprise-wide computer networks, intranets, and the Internet.

For purposes of illustration, application programs and other executable program components such as the operating system 805 are illustrated herein as discrete blocks, although it is recognized that such programs and components reside at various times in different storage components of the computing device 801, and are executed by the data processor(s) of the computer. An implementation of admission software 806 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any methods or technology for storage of information, such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The methods and systems can employ Artificial Intelligence techniques such as machine learning and iterative learning. Examples of such techniques include, but are not limited to, expert systems, case based reasoning, Bayesian networks, behavior based AI, neural networks, fuzzy systems, evolutionary computation (e.g., genetic algorithms), swarm intelligence (e.g., ant algorithms), and hybrid intelligent systems (e.g., expert inference rules generated through a neural network or production rules from statistical learning).

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A method comprising:
    determining a match between a threshold portion of audio data of a plurality of previous communication sessions associated with an originating device identifier associated with an originating device;
    determining, based on the match, that the originating device identifier is associated with an autodialing system;
    determining, based on determining that the originating device identifier is associated with the autodialing system, text data from audio data of one or more communication sessions initiated by the originating device;
    determining, based on comparing the text data to a database of keywords that indicate whether the one or more communication sessions are from an invalid autodialing system, that the autodialing system is invalid; and
    blocking, based on determining that the autodialing system is the invalid autodialing system, one or more future communication sessions associated with the originating device identifier.

2. The method of claim 1, further comprising:
determining that the originating device identifier is on an exceptions list; and
processing, based on determining that the originating device identifier is on the exceptions list, the one or more future communication sessions.

3. The method of claim 1, further comprising:
receiving the audio data of the plurality of previous communication sessions associated with the originating device identifier.

4. The method of claim 1, further comprising storing the originating device identifier in a database of invalid autodialing systems.

5. The method of claim 1, further comprising:
receiving the one or more future communication sessions associated with the originating device identifier; and
determining that the originating device identifier is associated with the invalid autodialing system.

6. The method of claim 1, further comprising determining whether the one or more communication sessions are associated with fraud.

7. The method of claim 1, wherein the plurality of previous of communication sessions comprise real-time transport protocol packets.

8. A method comprising:
receiving audio content from a plurality of communication sessions initiated by an originating device associated with an originating device identifier;
determining, based on a match between a threshold portion of audio content from the plurality of communication sessions, that the originating device identifier is associated with an autodialing system;
determining, based on comparing text data associated with the audio content to a database of keywords, that a communication session of the plurality of communication sessions is valid; and
establishing, based on determining that the communication session is valid, one or more future communication sessions associated with the originating device identifier.

9. The method of claim 8, further comprising determining, based on one or more attributes of one or more communication sessions of the plurality of communication sessions, that a communication threshold for the originating device identifier is satisfied, wherein the communication threshold comprises one or more of an answer seizure rate threshold, a call rate threshold, or a call hold time threshold.

10. The method of claim 7, wherein the one or more attributes comprise one or more of an answer seizure rate, a call rate, or a call hold time.

11. The method of claim 8, wherein the plurality of communication sessions comprise real-time transport protocol packets.

12. The method of claim 8, further comprising:
determining that an additional communication session initiated by the originating device is invalid; and
blocking, based on determining that the additional communication session is invalid, another one or more future communication sessions associated with the originating device identifier, wherein blocking the another one or more future communication sessions comprises routing the another one or more future communication sessions to an interactive voice response (IVR) system.

13. A method comprising:
establishing, based on a request comprising a device identifier of an originating device, a first communication session between the originating device and a first target device;
determining, based on a match between a portion of audio content from the first communication session and audio content from another communication session, that the originating device is associated with an autodialing system;
determining, based on determining that the originating device is associated with the autodialing system, text data from audio data of the first communication session;
determining, based on comparing the text data to a database of keywords that indicate that the first communication session is from an invalid autodialing system, that the autodialing system is invalid;
receiving a request to establish a second communication session between the originating device and a second target device; and
blocking, based on determining that the autodialing system is invalid, the request to establish the second communication session.

14. The method of claim 13, further comprising:
receiving another request comprising a device identifier of another originating device; and
determining, based on information associated with the device identifier of the another originating device satisfying a communication threshold, that the another originating device is associated with another autodialing system, wherein the information associated with the device identifier of the another originating device comprises one or more of an answer seizure rate, a call rate, or a call hold time.

15. The method of claim 13, further comprising blocking, based on determining that the autodialing system is invalid, one or more future communication sessions comprising the originating device.

16. The method of claim 15, wherein blocking the one or more future communication sessions comprises routing the one or more future communication sessions to an interactive voice response (IVR) system.

17. The method of claim 13, further comprising tagging, based on determining that the originating device is associated with the autodialing system, the device identifier as an identifier associated with the autodialing system.

18. The method of claim 13, further comprising:
receiving a request to establish a third communication session between the originating device and a third target device, wherein the request comprises the device identifier of the originating device;
determining, based on the device identifier being associated with the autodialing system, that the originating device is on an exceptions list; and
establishing, based on determining that the originating device is on the exceptions list, the third communication session between the originating device and the third target device.

19. The method of claim 1, further comprising tagging, based on determining that the originating device identifier is associated with the autodialing system, the originating device identifier as an identifier associated with the autodialing system.

20. The method of claim 8, further comprising tagging, based on determining that the communication session is valid, the originating device identifier as an identifier associated with the autodialing system.

21. The method of claim 20, further comprising storing, based on the tagging, the originating device identifier as the identifier associated with the autodialing system.

\* \* \* \* \*